United States Patent
Jones et al.

(10) Patent No.: US 6,622,540 B2
(45) Date of Patent: Sep. 23, 2003

(54) METHOD AND APPARATUS FOR FLEXIBLE MANUFACTURING A DISCRETE CURVED PRODUCT FROM FEED STOCK

(75) Inventors: Jerald E. Jones, Golden, CO (US); David E. Peck, Rochester Hills, MI (US)

(73) Assignee: Trico Products Corporation, Rochester Hills, MI (US)

( * ) Notice: Subject to any disclaimer, the term of this patent is extended or adjusted under 35 U.S.C. 154(b) by 0 days.

(21) Appl. No.: 09/900,075

(22) Filed: Jul. 6, 2001

(65) Prior Publication Data

US 2002/0043092 A1 Apr. 18, 2002

Related U.S. Application Data

(60) Provisional application No. 60/216,082, filed on Jul. 6, 2000.

(51) Int. Cl.$^7$ .............................................. B21D 37/16
(52) U.S. Cl. ........................ 72/342.5; 72/8.3; 72/11.2; 72/206; 72/342.6; 72/379.2
(58) Field of Search ........................... 72/7.4, 8.3, 8.9, 72/11.2, 11.6, 11.8, 203, 206, 240, 342.1, 342.5, 342.6, 342.94, 379.2

(56) References Cited

U.S. PATENT DOCUMENTS

| | | | |
|---|---|---|---|
| 1,590,854 A | 6/1926 | Rothera et al. | |
| 2,094,924 A | 10/1937 | Musselman | 251/144 |
| 2,428,825 A | 10/1947 | Arnoldy | 148/21.56 |
| 2,653,247 A | 11/1953 | Lundahl | 250/71 |
| 2,696,131 A | 12/1954 | Peterson | 80/56 |
| 3,728,924 A | 4/1973 | Wutke | 83/426 |
| 4,063,328 A | 12/1977 | Arman | 15/250.42 |
| 4,215,558 A | 8/1980 | Shiguma et al. | 72/9 |
| 4,244,204 A | 1/1981 | Vydrin et al. | 72/224 |
| 4,248,072 A | 2/1981 | Hasegawa et al. | 72/8 |
| 4,265,152 A | 5/1981 | Corradi | 83/106 |

(List continued on next page.)

FOREIGN PATENT DOCUMENTS

| | | |
|---|---|---|
| GB | 2 278 571 A | 7/1994 |
| JP | 02220714 | 9/1990 |
| JP | 06190575 | 7/1994 |
| JP | 07246411 | 9/1995 |
| JP | 10005872 | 1/1998 |
| WO | WO 99/51375 | 10/1999 |

OTHER PUBLICATIONS

H. Frackiewicz and W. Trampczynski, "A Laser Method of Sheet Metal Forming," Polish Academy of Sciences, Sep. 1992, pp. 685–689.

Alfred Joachim Balbach, "Der Laser Als Werkzeug Wirtshaftliche Einsatzbereiche von Laserbearbearbeitungsanlagen," VDI—Zietschrift 132(1990) Aug., No. 4 Spec., Dusseldoft, DE.

S. Holzer and F. Vollertsen, "Laserstrahlbiegen—Ein Beruehrungssloses Blechumformverfahren," WT Producktion and Management 84 (1994) Jan./Feb., No. 1/2, Berlin, DE.

*Primary Examiner*—Ed Tolan
(74) *Attorney, Agent, or Firm*—Bliss McGlynn, P.C.

(57) ABSTRACT

An apparatus for manufacturing a discrete curved product from a feed stock includes a source of heat that is adapted to impose a focused beam of light on at least one surface of a work piece to cause the surface of the work piece to expand and thereby move in the general direction of the heat source so as to impart a predetermined radius of curvature to the work piece. The apparatus is described in connection with one example where it may be employed to manufacture a curved backbone for a beam blade windshield wiper assembly from feed stock. In addition, a method of manufacturing a discrete curved product from feed stock, generally, as well as a discrete curved backbone for a beam blade windshield wiper assembly from feed stock, specifically, is also disclosed.

14 Claims, 8 Drawing Sheets

U.S. PATENT DOCUMENTS

| | | | |
|---|---|---|---|
| 4,785,653 A | 11/1988 | Danielsson | 72/249 |
| 4,836,774 A | 6/1989 | Harada et al. | 432/8 |
| 4,959,099 A | 9/1990 | Wilson | 72/244 |
| 5,228,324 A | 7/1993 | Frackiewicz et al. | 72/342.1 |
| 5,325,564 A | 7/1994 | Swanepoel | 15/250.42 |
| 5,485,650 A | 1/1996 | Swanepoel | 15/250.43 |
| 5,505,605 A | 4/1996 | Yeh | 425/150 |
| 5,510,596 A | 4/1996 | Xu et al. | 219/130.01 |
| 5,532,451 A | 7/1996 | La Rocca | 219/121.64 |
| 5,572,895 A * | 11/1996 | Hoving et al. | 72/342.94 |
| 5,590,556 A | 1/1997 | Fourie et al. | 72/237 |
| 5,592,842 A * | 1/1997 | Nyrhila | 72/342.94 |
| 5,719,374 A * | 2/1998 | Frackiewicz et al. | 219/121.66 |
| 5,875,672 A | 3/1999 | Fourie et al. | 72/240 |
| 6,063,216 A | 5/2000 | Damm et al. | 148/645 |

* cited by examiner

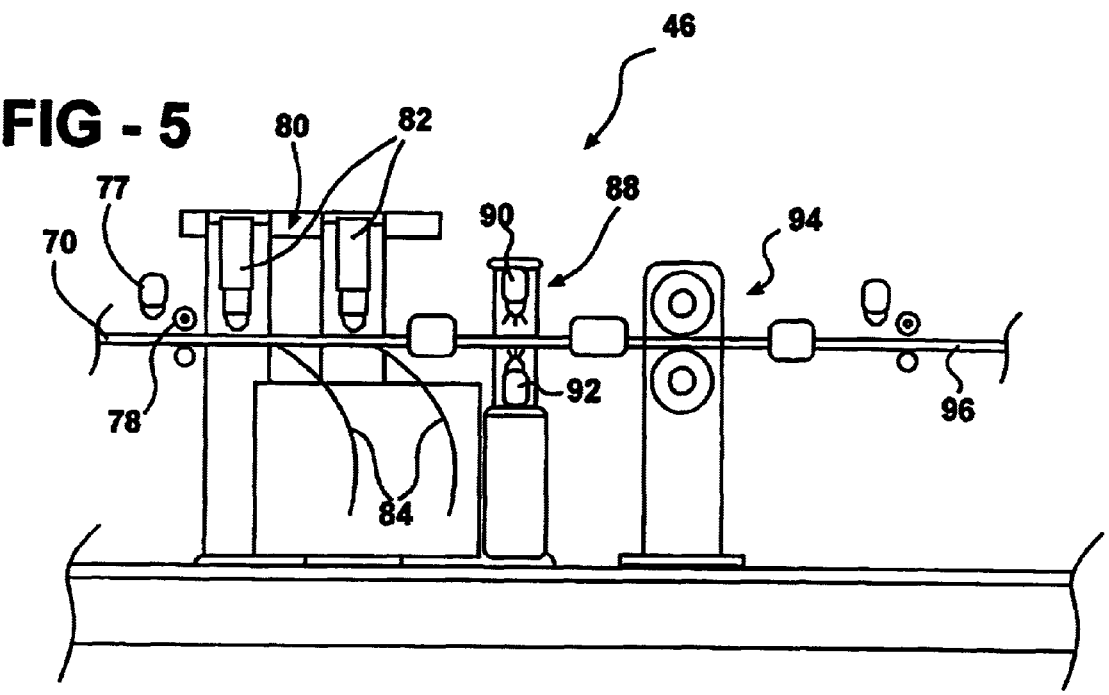
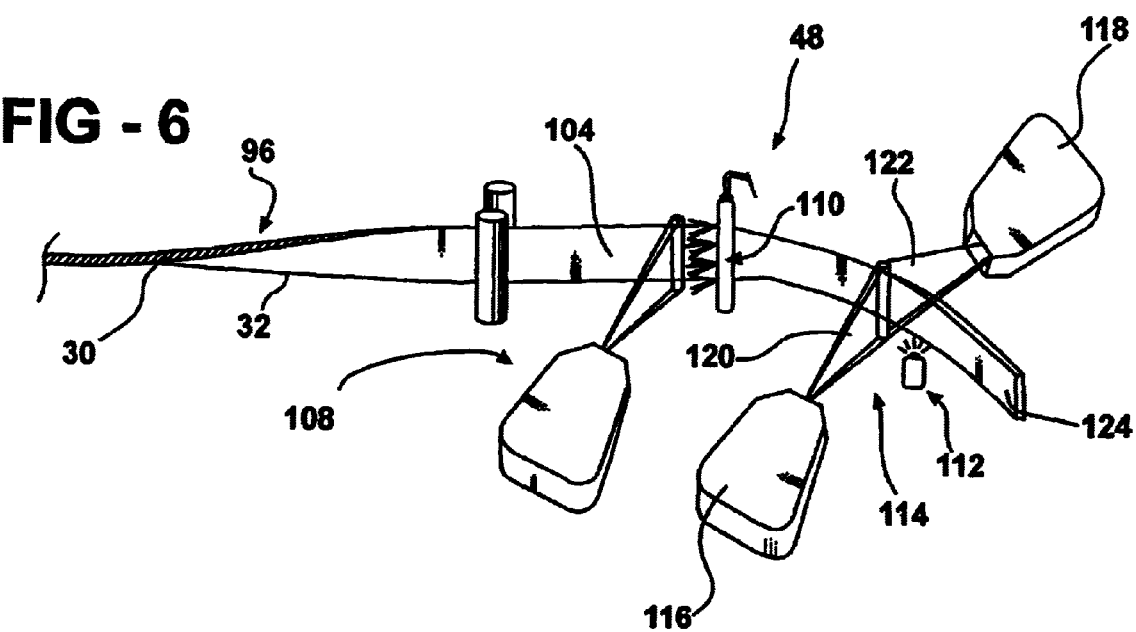

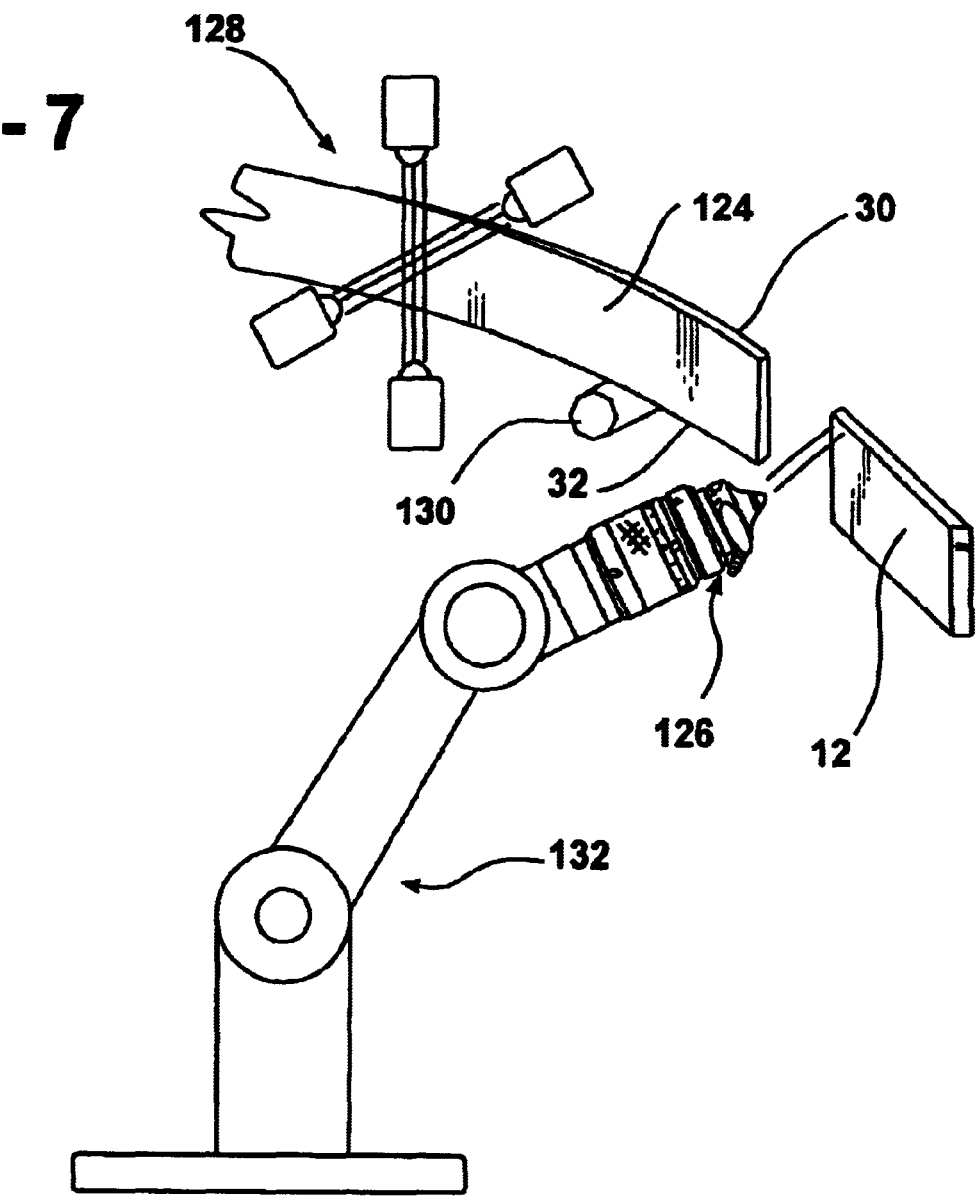

METHOD AND APPARATUS FOR FLEXIBLE MANUFACTURING A DISCRETE CURVED PRODUCT FROM FEED STOCK

This application claims priority to and all benefits from the provisional application having U.S. Ser. No. 60/216,082 filed Jul. 6, 2000 and entitled Method and Apparatus for Flexible Manufacturing a Discrete Curved Product from a Continuous Feed Stock.

BACKGROUND OF THE INVENTION

1. Field of the Invention

The present invention relates, generally, to a method and apparatus for flexible manufacturing and, more specifically, to a method and apparatus for flexible manufacturing a discrete curved part from feed stock.

2. Description of the Related Art

There are numerous parts, components, and sub-components that must be subjected to one or more manufacturing steps to impart a predetermined curvature thereto. These manufacturing steps typically require the use of hard tooling which can include multiple progressive dies, cold heading operations, tube bending operations as well as the need for other, associated components manufactured, for example, via plastic injection molding operations or the like. This tooling and related hardware as well as the batch type processing of such manufacturing operations ultimately have a significant impact on the cost of the manufactured part.

Curved parts, components, and sub-components are commonly employed in various automotive applications. As examples only, and not by way of limitation, such curved parts, components and subcomponents may be found in automotive seat frames, seat backs, brake lines, and other various structural elements which embody a bend in any way. One specific example includes automotive windshield wiper assemblies. More specifically, it is known to employ a single, elongated, curved, homogeneous strip that forms a spring "backbone" of the windshield wiper assembly. Such windshield wiper assemblies are sometimes referred to as "beam blade" type windshield wiper assemblies. The beam blade backbone is made from spring steel and may taper both in width and thickness from its center toward its free ends or tips. The backbone has a connecting formation at a central position for connection to a reciprocally driven arm. The arm applies a downward force and moves the blade assembly across the windshield. The backbone is curved along a plane that is similar to the plane of curvature as that defined by the windshield. A wiper element is secured to the backbone. The thickness and width of the backbone and its radius of curvature are preferably matched at every point along the length of the backbone so that the backbone will provide a force per unit length distribution in a longitudinal direction which increases toward both tips of the windshield wiper when the windshield wiper is in use, pressed downward intermediate its ends onto either a flat or complexly curved surface. Beam blade windshield wiper assemblies have the advantage of a lower profile as compared with tournament style wiper assemblies, consist of fewer parts and are considered to be aesthetically pleasing.

While such beam blade type windshield wiper assemblies have many desirable features and advantages, they can be difficult to manufacture and, due to the hard tooling required to shape, cut and curve the backbone, relatively expensive when compared with other conventional windshield wiper assemblies known in the related art.

However, the present invention overcomes these difficulties in the related art in a method and apparatus for flexible manufacturing a discrete curved part, such as the backbone of a beam blade windshield wiper assembly, from a feed stock. But, from the description that follows, those having ordinary skill in the art will appreciate that the method and apparatus of the present invention may be used to manufacture any discrete, curved part from a feed stock and that the invention is in no way limited to the particular application referred to above or described in greater detail below. Thus, the context of a beam blade type windshield wiper assembly as described herein is merely for example purposes to further illustrate the present invention, and not for any limiting purpose.

SUMMARY OF THE INVENTION

The present invention overcomes the deficiencies in the related art in a method and apparatus for flexible manufacturing a discrete curved product from a feed stock. The apparatus includes a source of heat that is adapted to impose a focused beam of heat on at least one surface of a work piece to cause the surface of the work piece to expand and thereby move in the general direction of the heat source and impart a predetermined radius of curvature to the work piece.

Applying the apparatus of the present invention in connection with the manufacture of a discrete curved backbone for a beam blade windshield wiper assembly from feed stock as disclosed in the specific example described herein, the apparatus includes a cold rolling mill that imparts a predetermined thickness to the work piece. The apparatus also includes a width profiling station that imparts a predetermined width to the work piece and a curvature forming and heat treat station. The curvature forming and heat treat station includes a first source of heat that is adapted to impose a focused beam of heat on at least one surface of the work piece. The beam of heat defines a major axis and a minor axis on the work piece. The major axis of the focused beam of heat is disposed substantially transverse to the relative movement of the work piece with respect to the beam of heat and imparts a predetermined radius of curvature about the major axis. In addition, the apparatus includes a cooler that cools the work piece after it has been heated by the first source of heat. A second source of heat is also employed to temper the work piece after it has been cooled.

A method of manufacturing a discrete curved product from a feed stock is also disclosed and includes the steps of providing a focused beam of heat on at least one surface of a work piece to cause the surface of the work piece to expand and thereby move in the general direction of the heat source and thereby impart a predetermined radius of curvature to the work piece.

As applied to the specific example of manufacturing a discrete curved backbone for a beam blade windshield wiper assembly from feed stock as described herein, the method includes the steps of imparting a predetermined thickness to the work piece and imparting a predetermined width to the work piece. The method also includes providing a first source of heat that is adapted to impose a focused beam of heat on at least one surface of the work piece wherein the beam of heat defines a major axis and a minor axis on the work piece and the major axis of the focused beam of heat is disposed substantially transverse to the relative movement of the work piece with respect to the beam of heat. The beam of heat imparts a predetermined radius of curvature about the major axis. In addition, the method includes the step of cooling the work piece after it has been heated by the first source of heat and tempering the work piece after it has been cooled.

Operator interface in a production line employing the method and apparatus of the present invention is minimal and consists, primarily, of monitoring the status of the production line and the product quality being produced, rather than control of the process. Ideally, the production line includes few or no hard tools, but rather, is primarily software controlled to allow changes and modifications to the end product's "on the fly." Thus, as will be described in greater detail below, a production line employing the method and apparatus of the present invention is "virtually tooled" and can produce any number of different parts without stopping or even slowing the manufacturing process. However, those having ordinary skill in the art will appreciate from the description that follows that, while the reduction in the use of hard tooling is an overall, general goal of the method and apparatus of the present invention, some hard tooling may still be employed in any given production line without deviating from the scope of the invention as defined in the appended claims.

Similarly, in the preferred embodiment contemplated by the inventors, the production line employing the method and apparatus of the present invention includes a digital signal processing computer having a neural network including a design database with predetermined manufacturing settings that control the overall process to produce the end product. Thus, the method and apparatus of the present invention offer numerous advantages over the traditionally hard-tooled production lines known in the related art. Most notably, these advantages include the ability to continuously flow process the working material while reducing or eliminating, as much as possible, the batching processes in the production of a part, component or sub-component. This advantage results in reduced costs, waste and labor expenses. The method and apparatus of the present invention also provides improvements in inventory turns and more efficient utilization of raw materials. Furthermore, the cost to manufacture and build a production line employing the method and apparatus of the present invention is less than the cost to tool a family of parts employed to manufacture products, such as windshield wiper assemblies, automotive seat frames, seat backs, brake lines, bent tubular products and other various structural elements that embody a bend in any way.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a schematic representation of a width profiling station;

FIG. 6 is a schematic representation of a curvature forming and heat treat station;

FIG. 7 is a schematic representation of a cutting station;

DETAILED DESCRIPTION OF THE PREFERRED EMBODIMENT(S)

Figure 1:
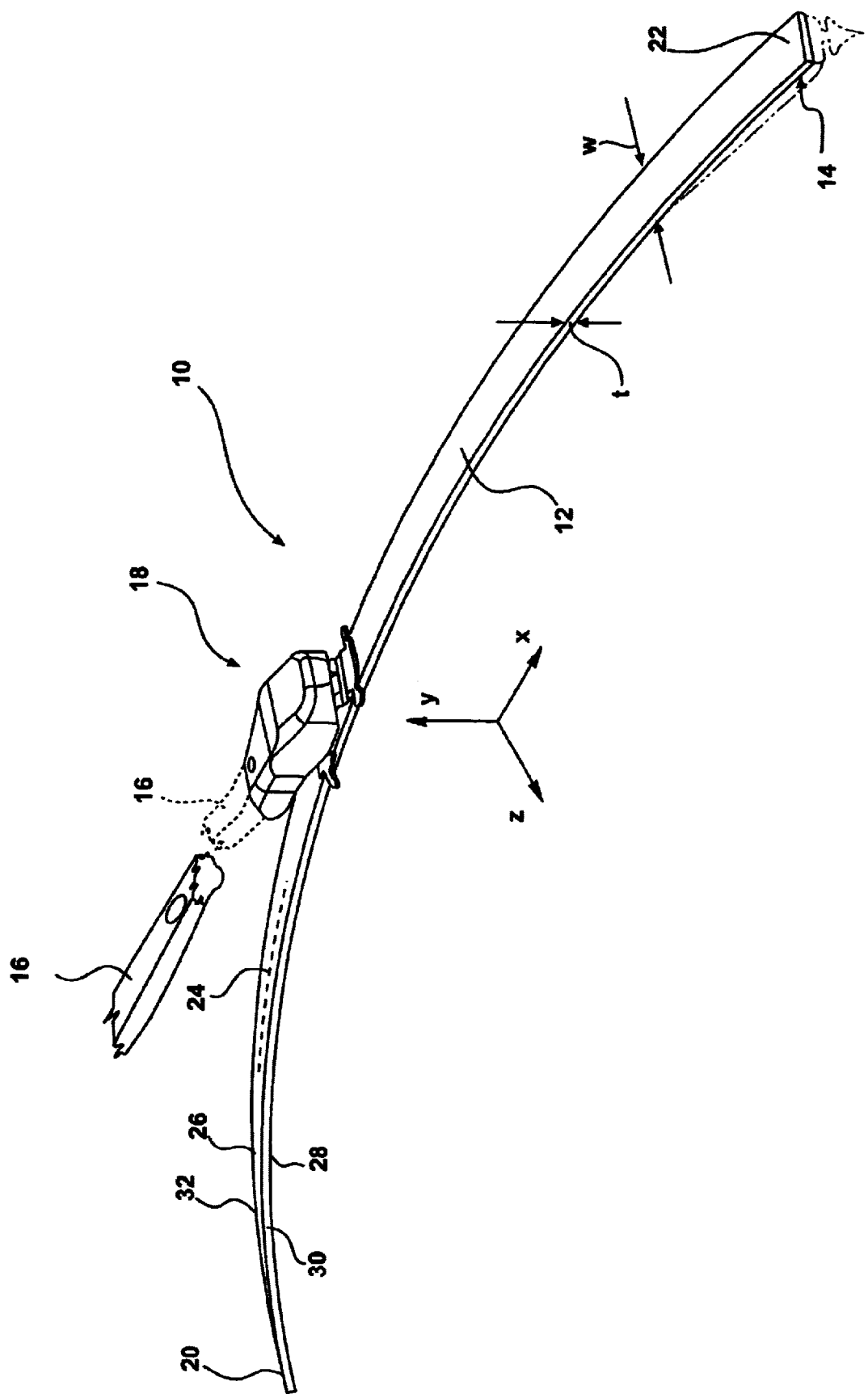
FIG. 1 is a perspective view of a beam blade wiper assembly having a backbone made using the method and apparatus of the present invention.

The method and apparatus of the present invention will be described in greater detail below in connection with one possible use for manufacturing a beam blade windshield wiper assembly. However, as noted above, those having ordinary skill in the art will appreciate from the description that follows that the method and apparatus of the present invention may be employed in connection with a number of diverse products and is in no way limited to the example described herein. To this end, a representative example of a beam blade windshield wiper assembly is generally indicated at 10 in FIG. 1, where like numbers are used to designate like structure and method steps throughout the drawings. The beam blade windshield wiper assembly 10 includes a backbone 12 and a wiper element 14. The beam blade windshield wiper assembly 10 is controlled and driven by a spring-loaded arm, a portion of which is illustrated in both continuous and phantom lines at 16 in FIG. 1. The beam blade windshield wiper assembly 10 is mounted adjacent the windshield (not shown) of a vehicle and pivotally driven to impart reciprocating motion to the beam blade wiper assembly 10 across the windshield, as commonly known in the art. The backbone 12 is connected to the arm 16 by a coupler, generally indicated at 18, which acts to releasably connect the wiper assembly 10 to the spring loaded wiper arm 16.

The elongated backbone 12 has a longitudinal beam length extending between first and second ends 20, 22. The beam length defines a median line 24 extending along the beam length. The coupler 18 is located at an intermediate position, commonly at the longitudinal center, between the first and second longitudinal ends 20, 22. However, those having ordinary skill in the art will appreciate that the coupler can be located biased toward one end, 20, or the other, 22. The backbone 12 is made of resiliently flexible material that applies a force from the spring loaded wiper arm 16 through the coupler 18 along the backbone's length to the first and second longitudinal ends 20, 22. The backbone 12 is typically made of a single, integral piece of material.

The backbone 12 includes an upper surface 26 and an opposed mounting surface 28 with first and second sides or edges 30, 32 extending therebetween. Preferably, the wiper element 14 is mechanically attached, bonded, chemically attached, or otherwise adhered to the mounting surface 28 of the backbone 12 and extends for a substantial portion of the longitudinal beam length. The cross-section of the backbone 12 is generally rectangular making the first and second sides 30, 32 generally perpendicular to both the upper surface 26 and mounting surface 28. However, the cross-section of the backbone 12 may include any suitable geometric shape. The backbone 12 has a width "W" defined along a width line drawn between the first and second sides 30, 32 and perpendicular to the median line 24. The thickness of the backbone 12 is defined by an imaginary line t extending perpendicular to the width between the upper surface 26 and mounting surface 28. In general, the width and thickness of the backbone may be consistent or the backbone may vary in width and/or thickness along its longitudinal length.

The backbone 12 is curved longitudinally with a predetermined free form shape or radius of curvature that, when operatively disposed, extends in the general direction of the plane of curvature of the windshield (hereinafter "windshield curvature"). An x-y plane is defined by a cross section taken longitudinally along the median line 24 and through the backbone 12 and wiper element 14, with the x-axis extending tangentially to the median line 24 at the center of the backbone 12 and the y-axis extending through the cross-section of the backbone 12 and wiper element 14. A z-axis extends perpendicular to the x-y plane in the direction of a width line drawn at the center or connecting portion of the backbone 12 to the coupler 18. The curvature of the backbone 12 in the x-y plane may be symmetrical or asymmetrical depending on the force requirements and the contour of the windshield. The flexible, free form, pre-curved backbone 12 flattens out, or the curvature is reduced, such that the backbone will conform when the wiper arm 16 applies a force thereto on a windshield. Thus, the backbone 12 must have adequate free-form curvature to ensure a good force distribution on windshields having various curvatures and to effect proper wrapping about the windshield.

Figure 8:
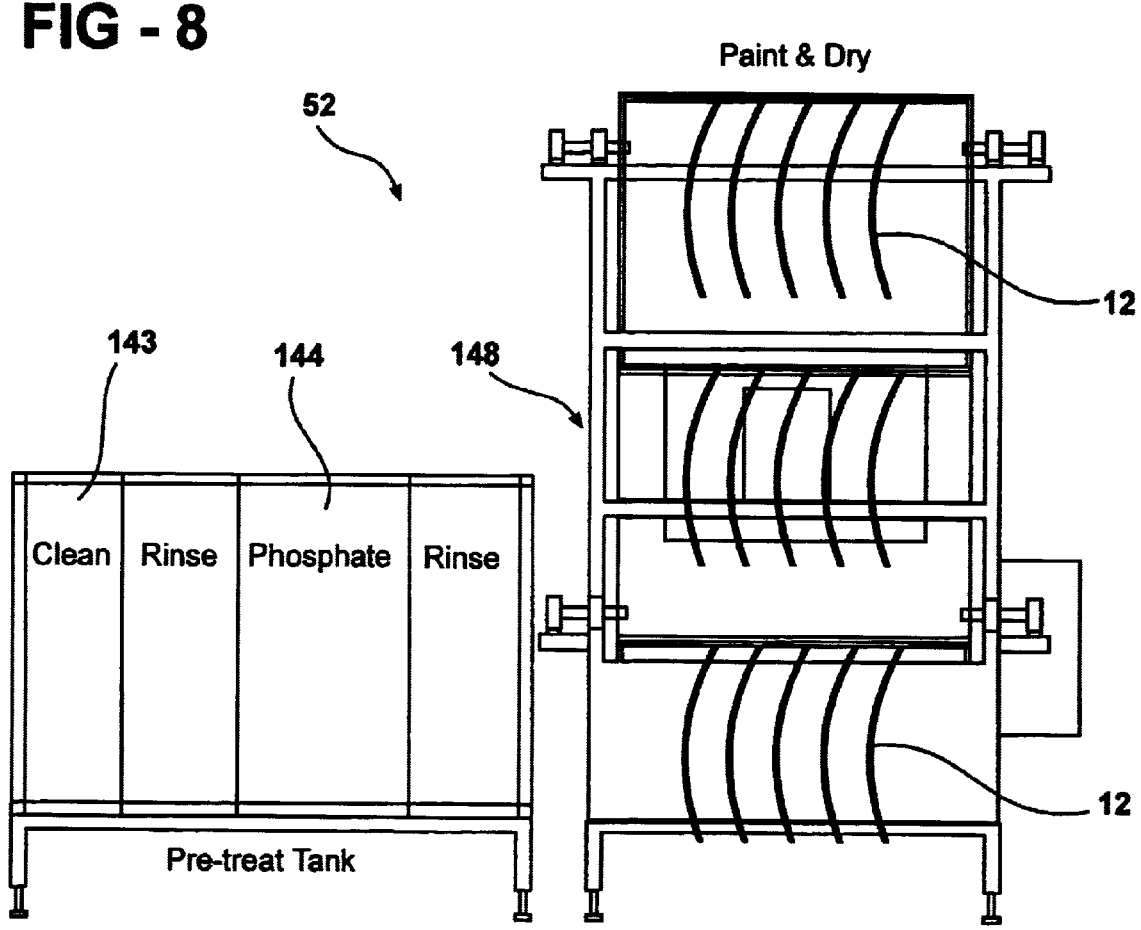
FIG. 8 is a schematic representation of a part cleaning and painting station.

In connection with such beam blade windshield wiper assemblies (as well as numerous other products) there is a need to manufacture the long, thin, curved backbone 12 in a manner capable of supplying a high volume automotive application in an efficient, cost effective manner. Furthermore, there may be a need to manufacture such a component that may have a tapered shape in either or both of its width W or thickness t. The present invention includes a method and apparatus which may be employed to manufacture such a component and which may form a part of a flexible production line, generally indicated at 40 in FIG. 2. In general, the flexible production line 40 may be employed to manufacture any number of discrete, curved components or parts. However, the production line 40 will be described in the context of manufacturing a curved, backbone of a beam blade type windshield wiper assembly 10 of the type illustrated in FIG. 1. Those having ordinary skill in the art will appreciate from the description that follows that the method and apparatus of the present invention may be employed to manufacture any number of curved parts, components and/or sub-components and that the present invention is not limited to automotive applications, in general, nor windshield wiper assemblies, in particular. To this end, such a production line 40 may include a source of a work piece, such as a wound coil of spring steel, generally indicated at 42 (FIGS. 2 and 3); a cold rolling mill, generally indicated at 44 (FIGS. 2 and 4); a width profiling station, generally indicated at 46 (FIGS. 2 and 5); a curvature forming and heat treat station, generally indicated at 48 (FIGS. 2 and 6); a cutting station, generally indicated at 50 (FIGS. 2 and 7) and a part cleaning and painting station, generally indicated at 52 (FIG. 8). Each stage of the production line 40 will now be described in greater detail below.

Figure 3:
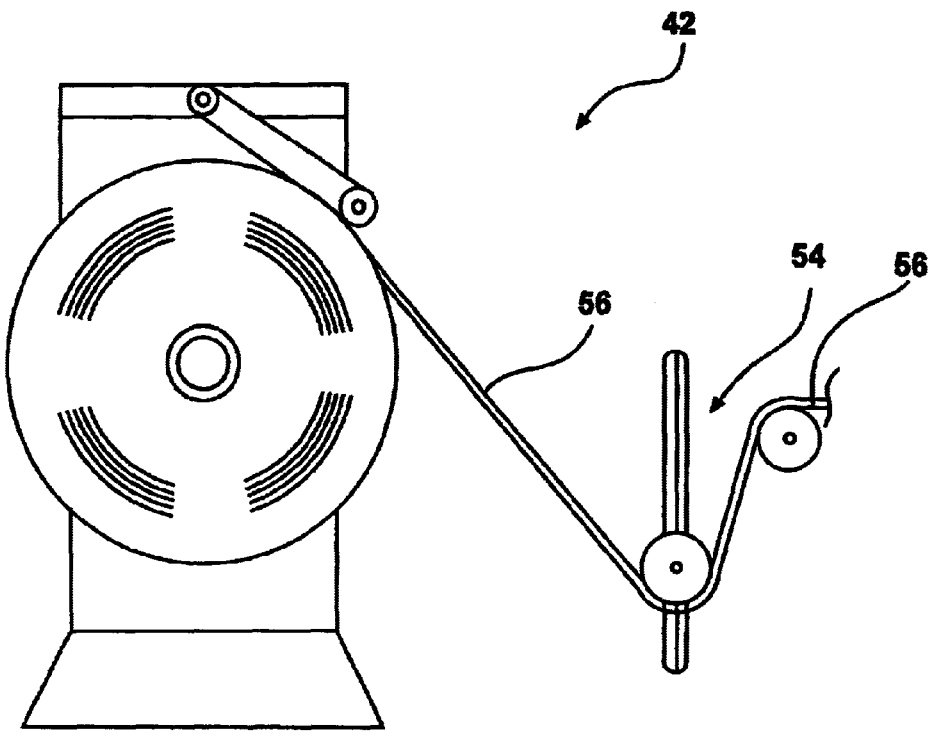
FIG. 3 is a schematic view of a wound coil of spring steel.

Referring specifically to FIG. 3, and for purposes of manufacturing the backbone 12, the wound coil of steel 42 is preferably a medium carbon-manganese spring steel, for example SAE 6150 or other low alloy steels in the medium carbon range. The coil 42 is oscillate wound off the master coil and is butt welded and cold cross rolled at the joining points. The butt weld area is annealed. The coil 42 includes a take up loop, schematically indicated at 54. The take up loop 54 is weighted to produce a back tension in the material or work piece, schematically illustrated at 56, before it enters the first operation. The coil 42 may also include a laser vision system 55 (FIG. 4) installed over the material so that the butt joined area may be identified. The location of the butt joined areas is sent down a serial bus so that no parts will be made from joined material.

Figure 4:
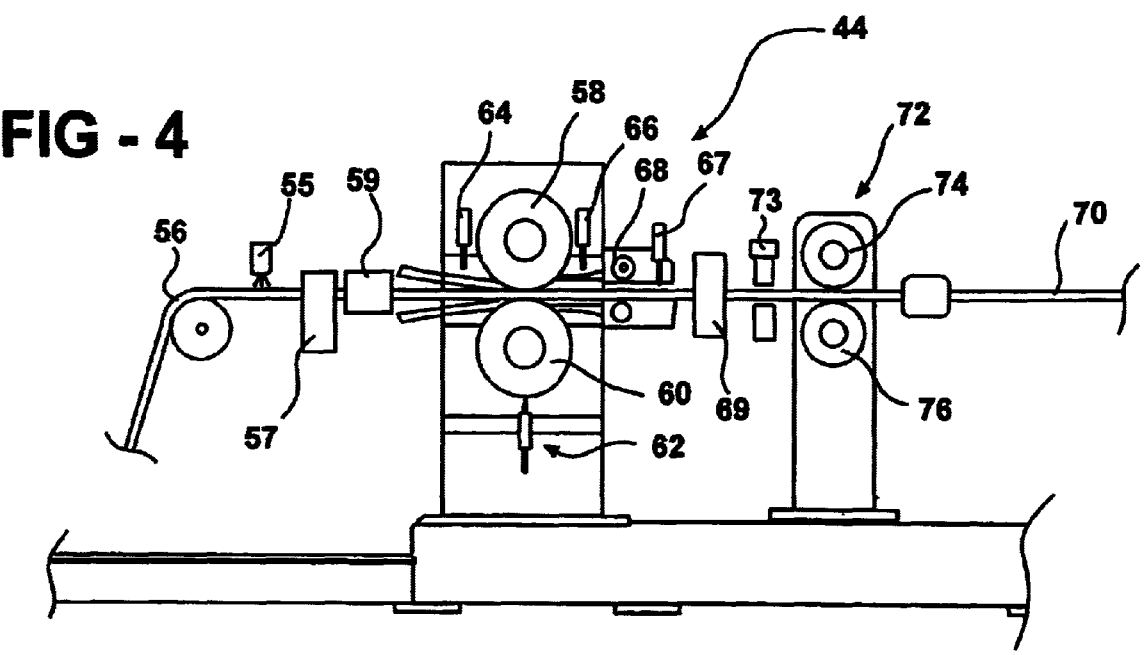
FIG. 4 is a schematic representation of a cold rolling mill.

From the coil 42, the steel working material 56 has a light film of oil rolled or sprayed onto both sides of it (schematically indicated at 57 in FIGS. 4 and 9) and is then guided into the cold rolling mill 44 (FIG. 4). The rolling mill 44 is designed to condition the work piece by imparting a predetermined constant or variable thickness t thereto. To this end, the cold rolling mill 44 may include fixed, tapered and vertical guides and programmable side rollers (schematically represented at 59). The rolling mill 44 includes a pair of opposed, rollers 58, 60 which are rotatable about axes disposed generally transverse to the direction of travel of the working material 56 as it flows through the mill 44 and between the rollers 58, 60. At least one of the rollers 58, 60 is movable in a direction perpendicular to the path of the working material 56 through the mill 44 and toward or away from the other roller. More specifically, and as illustrated in the preferred embodiment of FIG. 4, the roller 60 is movably mounted to a hydraulic actuator, schematically indicated at 62. A pair of roll sensor assemblies, 64, 66, are mounted across corners to measure the separation between the rollers 58, 60 at 0.2 mm linear position increments of the material 56. The sensors 64, 66 form a part of a control system that will be described in greater detail below.

In the representative example disclosed herein, it is desired that the backbone 12 taper in both width and thickness. The width of the backbone 12 will be addressed at the width profiling station 46 described in greater detail below. A tapered thickness is imparted to the steel working material 56 at the rolling mill 44. Thus, in the preferred embodiment, the mill 44 has high stiffness, without back up rollers, because the material width of the backbone is less than 30 mm. To the extent that the thickness of the backbone varies, the variance of the material 56 must be controlled to plus or minus 20 $\mu$m. The material 56 is always reduced by at least 0.3 mm and can be reduced as much as 1.1 mm. The cold rolling mill 44 may generally be of the type disclosed in U.S. Pat. No. 5,590,566 issued on Jan. 7, 1997 and entitled, "Apparatus for the Manufacturing of a Thin Metallic Strip"; and/or U.S. Pat. No. 5,875,672 issued on Mar. 2, 1999 and entitled, "Method and Apparatus for Manufacturing Metallic Support Beams for Windscreen Wiper Blade Assemblies." Both of these patents are assigned to the assignee of the present invention. The disclosures of these patents are incorporated herein by reference.

The driven rollers 58, 60 pull the material from the take up loop 54. The actual outgoing material thickness may vary depending on the desired operating parameters of the end product being manufactured, in this example, the beam blade windshield wiper assembly. Thus, the material's thickness is also measured at 67 using a linear thickness measuring device. The material's actual thickness is then compared to the rolling mill's targeted thickness. Furthermore, an incremental shaft encoder, generally indicated at 68, is employed to measure the linear position down the axis of the semi-formed part. The separation of the rollers 58, 60 is controlled by a digital signal process controller which receives feedback from the various sensors 64, 66, 67 and encoder 68, as will be discussed in greater detail below.

Because of the tight thickness and thickness gradient tolerances that may be required to manufacture any given product, such as the backbone 12, a program logic controller (PLC) cannot process the incoming sensor information within a desirable and acceptable time interval. Thus, a digital signal processing (DSP) computer that is capable of processing the material thickness in real time as it is seen by the sensors, for example, 64, 66 which measure the amount of separation between the rollers 58, 60 and sensor 67 which measures the thickness of the material after it has passed through the rollers 58, 60, is required to control the operation of the method and apparatus of the present invention. To this end, the digital system processing computer (schematically indicated at 71 in FIG. 9) employed with the method and apparatus of the present invention also utilizes a neural network machine controlled program which is fed with various thickness and position information so that adjustments in spacing between the rollers 58, 60 can be made in real time thereby allowing the thickness and thickness gradient tolerances to be held. In this way, the profile of the material 56 will be accurately modified so that the cold rolling mill 44 provides a semi-formed, continuous strip of metal, generally indicated at 70, having a predetermined thickness that may vary along the length of the strip 70. The digital signal processing computer 71 utilizing the neural network will be described in greater detail below.

Thereafter, any residual oil left on the semi-formed part 70 from the cold-rolling process may be removed as indicated at 69. Furthermore, a tensioner assembly, generally indicated at 72, is employed to ensure that the semi-formed part 70 is kept under tension and to help straighten out the edge curvature of the material 70. The tensioner assembly 72 has two opposed rollers 74, 76 that are controlled using servo drive motors. The torque generated by these rollers 74, 76 is sufficient to continuously move the semi-formed material 70 therethrough and can produce enough torque to provide up to 30 percent of the pulling power for the entire rolling process. The pulling force is sufficient enough to "pull the tail straight" on the semi-formed part 70, thus removing the edge camber of the material. Programmable side rollers 59 on the incoming side of the rolling mill 44 can also be employed to help laterally move or resist the material movement, so as to help the tensioner assembly 72 straighten the edge camber. An ink-jet marker 73 may be used to selectively mark a line on the semi-formed part 70 at predetermined places therealong to designate the end/beginning of a fully formed part as will be described in greater detail below. However, those having ordinary skill in the art will appreciate that numerous other repeatable marking techniques may be employed for this purpose. For example, and as an alternative to an ink jet mark, some predetermined physical or geometric change in the material or material thickness or surface of the work piece may be imparted to designate the beginning and/or the end of a fully formed part.

Figure 2:
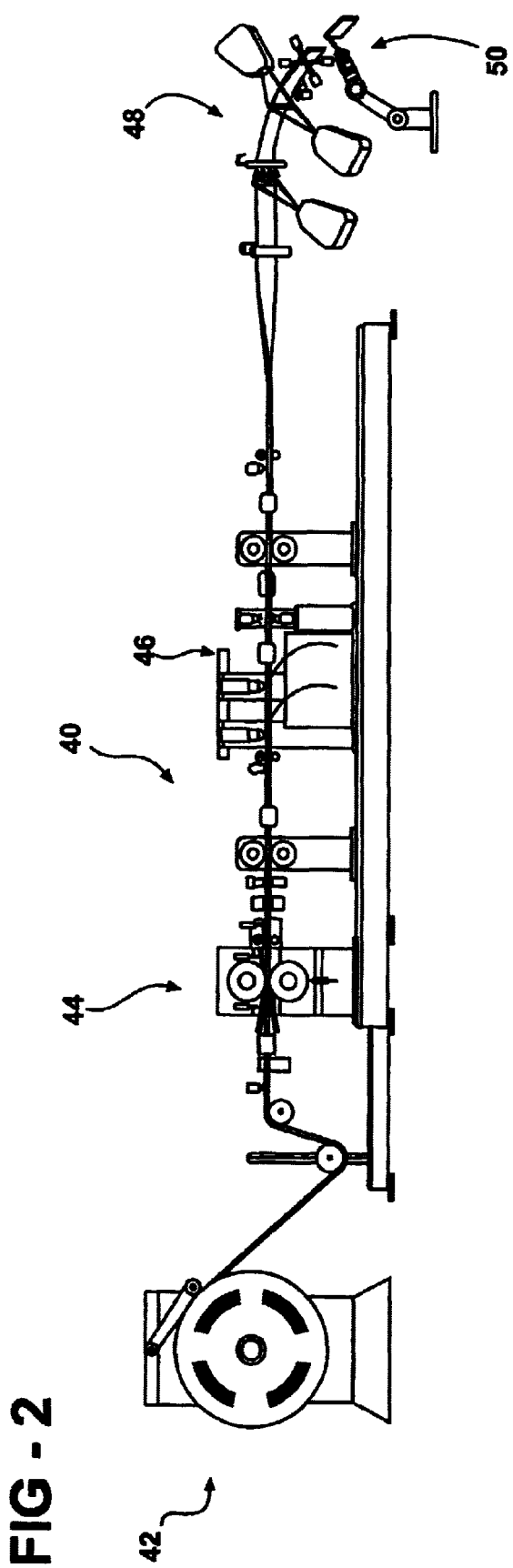
FIG. 2 is a schematic representation of a production line for manufacturing a discrete, curved part from feed stock.

The semi-formed continuous strip material 70 having a variable thickness is then transferred to the width profiling station, generally indicated at 46 in FIGS. 2 and 5. A vision system 77 may be employed to identify the starting point of each individual designated part (as noted by the ink jet mark or other marking technique) that enters this width profiling station 46. A linear encoder, generally indicated at 78, rechecks the length position on the part identified by the ink. The width profiling station 46 includes a cutting station, generally indicated at 80. More specifically, and as illustrated in the preferred embodiment, a twin-headed laser 82 is mounted over the semi-formed part 70 and projects the focal position of the laser optics onto the part 70. To this end, the laser 82 is mounted at a predetermined, proper height above the part 70 to provide an optimum cut. The twin heads are placed apart so that the optics do not interfere with each other and so that they can cut the part 70 to a minimum width of 4 mm. In the preferred embodiment contemplated by the inventors, the cutting station 80 employs a 2.2 KW diode pumped Nd: YAG laser, equipped with a 50/50 laser beam splitter. The laser is remotely mounted relative to the part 70 and the laser power is provided to the work station 46 via two fiber-optic cables (not shown). Alternatively, the cutting station 80 may incorporate a pair of $CO_2$ lasers, or any other suitable cutting source.

As indicated in FIG. 5, as the laser cuts the width of the part 70, the scrap material, generally indicated at 84 is pulled down and away from the part 70 so that it can be cut into small pieces for disposal. In addition, the material 70 is notched, as indicated at 86 in FIG. 9, for purposes of mounting the coupler 18 to the backbone 12 as described above. An overhead width laser measuring system, generally indicated at 88, is employed to verify the actual width and position dimensions of the part after it has been cut by the overhead laser 82. The measuring system 88 uses an overhead line laser beam 90 and an underneath camera 92 to measure the projected shadow of the part width. In addition, another tensioner assembly, generally indicated at 94, is employed to keep a light tension on the part in the width profiling station 46 of the production line 40. However, in the preferred embodiment illustrated in this figure, the tensioner assembly 94 includes only a single servo drive motor. The width profiled material or work piece produced from the cutting station 46 is schematically represented at 96 in FIGS. 5 and 6.

In addition to the sensors and measuring system discussed above and illustrated in the figures, for any given curved component that could be manufactured using the method and apparatus of the present invention, there may be a need for additional, similar or even different sensing and measuring systems to provide adequate feedback and control of the overall process. For example, those having ordinary skill in the art will appreciate that a measuring system of the type described above, and generally indicated at 88 in FIG. 5 as well as additional sensors of the type described above and identified at reference numbers 67 and 68 in FIG. 4 could be added to the flexible production line 40 after the tensioner assembly 72 and before the width profiling station 46 so that additional data regarding the relevant characteristics of the work piece at this point in the process may be collected and used to control the overall process. Thus, from the overall description of the method and apparatus of the present invention contained herein, those having ordinary skill in the art will appreciate that the number, type and purpose of the sensors described herein is not exhaustive and that additional like devices could be employed throughout the production line.

Following the cutting station 46, the newly profiled material 96 is fed to the curvature forming and heat treatment station, generally indicated at 48 in FIGS. 2 and 6. To this end, the position of the material 96 is again identified by the paint markings or predetermined physical, geometric change in the material thickness that indicates the predetermined beginning and end of the backbone 12 which will ultimately be manufactured in this representative example. Furthermore, a shaft encoder 98 (FIG. 9) is employed to re-identify the predetermined length of the end product and a width re-identification laser sensor is employed for determining the center of the final product. The strip material 96 may be rotated 90° (see also 100 at FIG. 9) so that it is disposed on one of its edges 30, 32. In essence and in this example, the material 96 is twisted 90°. The twisting is done in the elastic range of the material 96 so as to impart no additional residual stresses in the part material. However, those having ordinary skill in the art will appreciate that rotation of the part is not critical to the invention.

Figure 9A:
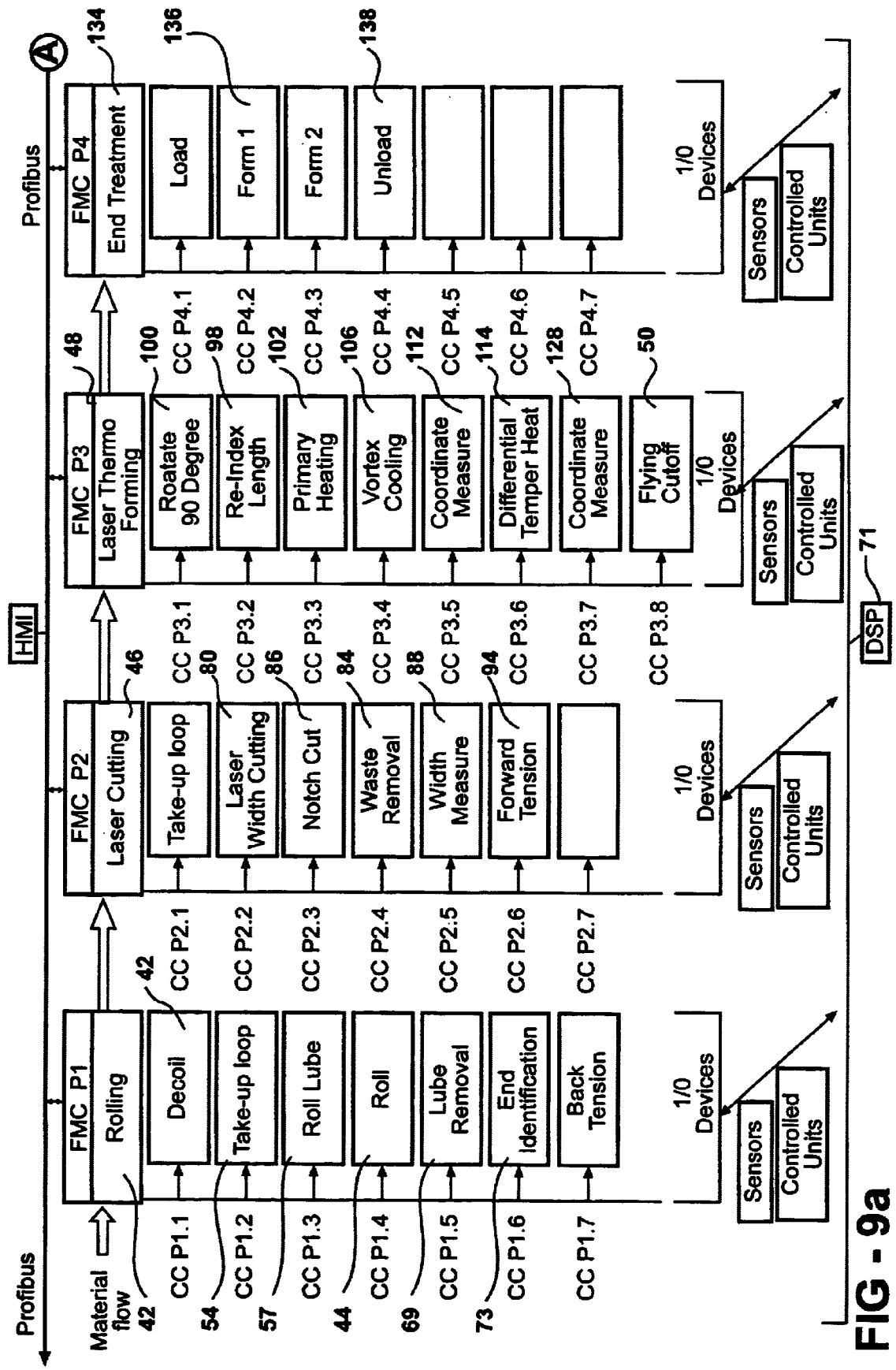
FIG. 9 is a flow chart illustrating each step of a flexible manufacturing process of the present invention as it is applied to the manufacture of a beam blade windshield wiper assembly.
Figure 9B:
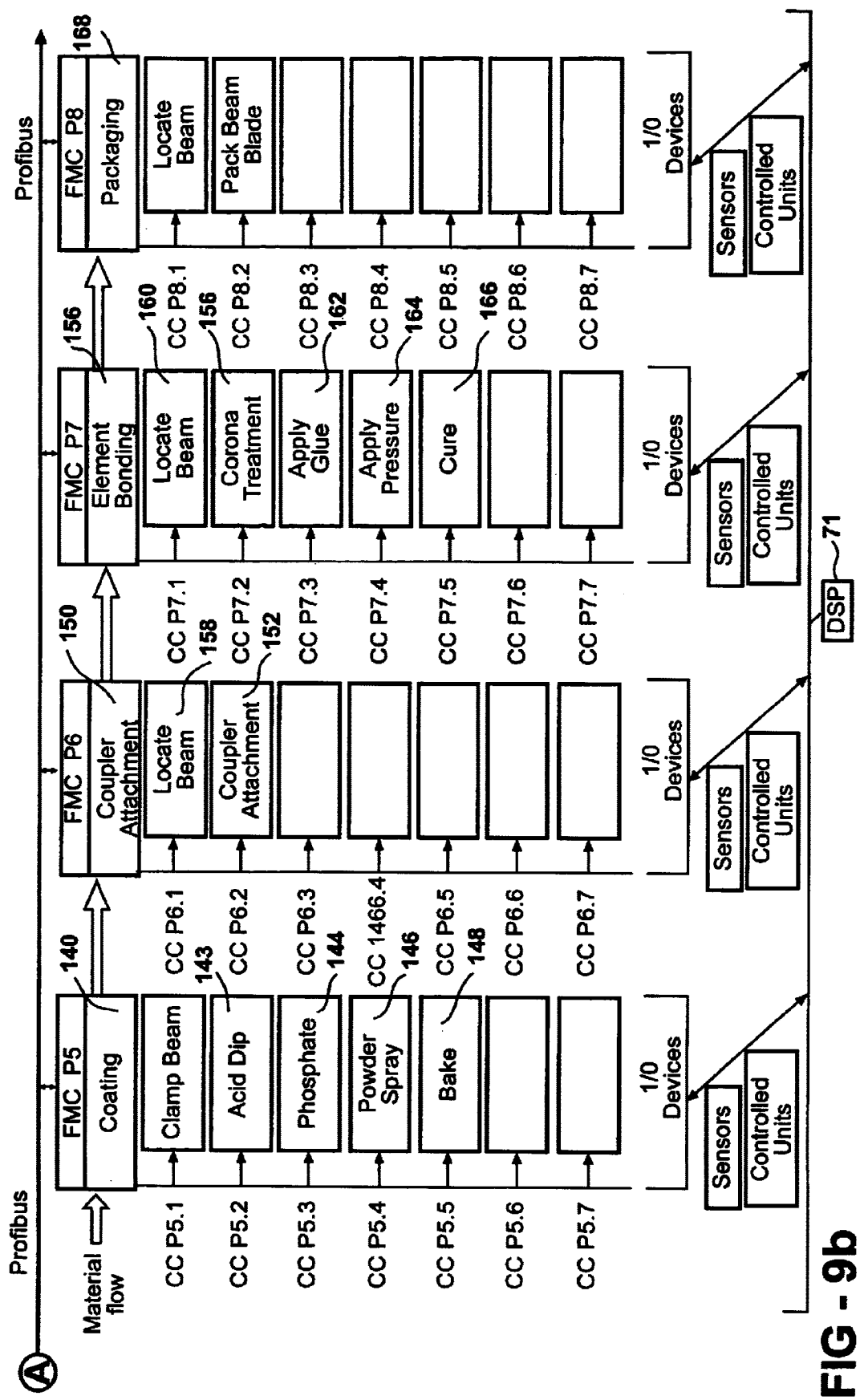

Next, a curvature of predetermined radius is then permanently imparted to the material 96 between its predetermined beginning and end points (see 102 at FIG. 9). This predetermined radius of curvature is imparted to the material 96 by heating one surface 104 of the material 96 so as to expand, but not necessarily melt, the material and thereafter immediately cooling the material (see 106, FIG. 9) in a rapid fashion. For this purpose, the apparatus of the present invention includes a first source of heat that is adapted to impose a focused beam of heat on at least one surface of a work piece. One preferred embodiment of a source of heat as contemplated by the inventors includes a laser that produces a diffuse beam of light directed toward at least one surface of the work piece. Another preferred embodiment of the first source of heat is a water-cooled, plasma, infrared lamp that also produces a beam of light directed toward at least one surface of the work piece. A suitable water-cooled, plasma, infrared lamp is available from Vortek-Technologies who maintain a website at www.vortek.com. Those having ordinary skill in the art will appreciate that there may be other sources of heat that could be employed in the method and apparatus of the present invention. All that is necessary is that the first source of heat be capable of imparting a predetermined radius of curvature to the work piece as described in greater detail below. Accordingly, the present invention as hereinafter further described will be presented in the context of a laser employed as the first source of heat.

To this end, one preferred embodiment of the method and apparatus of the present invention employs a laser, generally indicated at 108, that is focused on one surface 104 of the part 96. The laser 108 employs a diffused beam of oval or "line-like" configuration having a major axis extending transverse to the longitudinal axis and movement of the material 96. The oval shaped beam extends transverse to the surface of the work piece. Said another way, the beam of heat extends across, or substantially across, the entire width of the part. As noted above, the power of the laser 108 is modulated and controlled so as, ideally, not to melt the surface 104 of the part 96 but rather to expand the surface 104 of the material 96 upon which the beam impinges. As the one surface of the work piece expands, the work piece moves in the general direction of the heat source, in this case, the laser, thereby imparting a predetermined radius of curvature to the work piece. As the one surface of the work piece expands, it has been observed that this process causes the material on that one surface to "gather" so as to impart the bend to the work piece.

In the preferred embodiment, the laser is a 6 KW direct diode laser 108 having an oval-shaped beam output with a length along its major axis of approximately 12 mm and a length across its minor axis of approximately 1 mm. However, in the preferred embodiment, the beam should be sized so that it extends across, or substantially across, the width of the surface that is being treated. The beam is scanned along a predetermined portion of the surface 104 of the material of each end product in the direction of the longitudinal axis of the material 96. In the embodiment illustrated here, the material 96 moves relative to the laser beam. However, those having ordinary skill in the art will appreciate that the beam could be moved relative to the material. Similarly, while the backbone of the beam blade windshield wiper assembly described in detail herein may have a predetermined radius of curvature imparted thereto using a single source of heat that is scanned over the work piece in a single pass, those having ordinary skill in the art will appreciate that one or more sources of heat may be employed for any given application and that the work piece may be scanned by the beam of heat multiple times. Furthermore, where multiple sources of heat are employed, those heat sources may be engaged at the same of various positions on the work piece and may be adapted to impose both focused and defocused beams thereon.

In any event, immediately after it has been heated by the laser 108, the surface 104 is cooled. This process may be achieved using passive or active cooling techniques. In the preferred embodiment, the expanded surface 104 of the material is actively cooled using a vortex cooler 110. The vortex cooler 110 is located adjacent to the point of impingement of the laser on the surface 104 of the material 96. The vortex cooler 110 is of the type manufactured by Exair Corporation located in Cincinnati, Ohio and having a website at http://www.exair.com. However, those having ordinary skill in the art will appreciate that any number of suitable cooling mechanisms commonly known in the art may be employed for this purpose.

While the material is being heated by the laser 108, it is fully austenized However, when it is cooled, the material attempts to return to its original thickness but is cooled too rapidly for this to occur. This heating/cooling process results in material forces that impart a curvature to the material 96 along its longitudinal axis. At the same time, the rapid cooling is sufficient to produce a thorough hardness that is an untempered martinsite at RC 58/60. Rapid cooling results in a surface and sub-surface strain on the area of the work piece that is being cooled. These strains are vectored in the general direction of the constriction. It has been noted that, since the work piece is heated adjacent to the area that is cooled, the heated material cannot sustain a resisting strain to oppose the strain produced in the cooled area. In this case, the surface of the area of the work piece that is being cooled is pulled toward the area that is being heated thereby imparting a permanent predetermined radius of curvature to the work piece. The curvature forming and heat treatment station 48 may therefore include a curvature-sensing system as indicated at 112 in FIGS. 6 and 9 disposed as close to the laser 108 and vortex cooler 110 as possible.

The laser power is modulated to control the actual radius of curvature of the part being manufactured to the specified radius. To this end, the digital signal processing controller 71 for the overall system employs a neural network software system to control the process variables, including the material thickness, width profiling, curvature and thermal expansion properties. In one embodiment contemplated by the inventors, the neural network employed in connection with the production line 40 may have one hundred or more nodes. Each node is defined by a weighted value and by connections to other nodes. Various weighted values may be used to simulate the nodes of a neural network, depending on the part being manufactured in connection with the production line 40, the type of material employed as well as a number of other factors. Thus, the exact network configuration and weighted values will vary depending on the specific application (e.g. type and metallurgical makeup of the material employed, thickness of the material, type and power of the heat source, type of power supply, speed of the material flowing through the production line 40 as well as the nature and the number of sensors employed in the production line 40).

The input nodes of the neural network receive digital voltage signal data in a certain, real time, window. The nodes may be either evenly or non-linearly spaced in the time window. In any event, the neural network is deterministic, in that a given input will always produce the same output. In the example discussed herein, the neural network provides an output that indicates whether the thickness of material 70 produced at the rolling mill 44 is produced within acceptable ranges; whether the width of the material 96 produced at the width profiling station 46 has been cut within acceptable levels; whether the curvature imparted to the material 124 in the curvature forming and heat treat station 48 is within acceptable levels; and whether the part 12 has been cut to its proper dimensions in the cutting station 50. The digital signal processing controller 71 adjusts various parameters at each of these stations 44, 46, 48 and 50 by sending the required control signals to various sensors 55, 64, 66, 67, 68, 73, 76, 88, 98, 112 and 128 (FIG. 7), as well as possibly other sensors, which control the operations at each of these stations.

In this regard, the real time digital signal processing controller 71 performs the step of comparing parameters sensed by the sensors with the parameters stored in one or more look up tables contained within the memory of the digital signal processing controller 71. The contents and format of the look up tables will vary depending upon a number of factors including, but not limited to, the type of part being manufactured, the material used to manufacture the part, its thickness, the type of laser and power for the laser, etc. The contents of any given look up table are determined during actual pre-production prototyping experiments. Once an entry in the look up table is found that matches the parameters sensed by the various sensors and fed to the digital signal processing controller 71, the controller compares the actual reading to the information contained in its look up tables and adjusts the necessary parameters to drive the actual readings sensed by the sensors to the desired readings contained within the look up tables. This sophisticated control apparatus allows the rolling mill 44 as well as the lasers 80 and 108 (and lasers 116, 118 and 126 described below) to adapt their power to make the backbone 12 to the desired dimensions and material properties.

After the predetermined radius of curvature is imparted to the material 96, it is then heat-treated. Thus, the apparatus includes a tempering station, generally indicated at 114 in FIG. 6. More specifically, the material 96 is then tempered back to a RC 46/50. Those having ordinary skill in the art will appreciate that the tempering station may include any suitable tempering device, such as traditional induction tempering devices as well as any other tempering devices commonly known in the art. However, with respect to the embodiments disclosed herein, the tempering device is a second source of heat disposed, preferably, in non-contacting relationship to the work piece. More specifically, the tempering device may include a laser that impinges a beam of light on the work piece thereby tempering it. Alternatively, the tempering device may include an infrared lamp, and preferably a water-stabilized plasma infrared lamp.

Notwithstanding the various tempering devices that may be employed for this purpose, in the preferred embodiment, tempering is accomplished by the use of two, opposed direct diode lasers 116, 118 that emit a pair of defocused laser beams 120, 122, respectively which impart the heat treatment. It is believed that, in the preferred embodiment, the tempering process should be done using a non-contacting method so as to not change the freeform curvature of the material 96 that has been induced using the laser 108. Furthermore, because the specific part curvature and its length may vary from end product to end product, the position of the tempering station 114 relative to the surface of the material 96 must float in the vertical plane of the material's normal deflection movement. However, the focus of the beams produced by the opposed lasers 116, 118 on the opposed surfaces of the material 96 must be maintained at the proper distance to temper the material 96 to the specified hardness.

The material or work piece produced at the curvature-forming and heat-treat station 48 is schematically indicated at 124 in FIGS. 6 and 7. This material 124 is now complete from a thickness, width, curvature and heat treatment standpoint. It must now be cut to a predetermined length. Since the individual length and curvatures of various end products may vary, the position in space where the material 124 is cut must also float in both the vertical plane (due to the part curvature) as well as to its longitudinal position (due to the length changes of the end products). Accordingly, in the preferred embodiment, it is believed that the material 124 must be cut using a non-contacting method so as not to change the curvature in the part in the upstream curvature-forming and heat-treating station 48. At the same time, the material 124 may need to be edge-supported so as not to cause a shockwave to be sent back through the material upstream from the point that it is being cut. Accordingly, in the preferred embodiment, the method and apparatus employs a cutting station 50 using a cutoff laser 126. A coordinate measuring system, generally indicated at 128 in FIGS. 7 and 9 is employed to determine the exact position and location of the material prior to cutting. In the preferred embodiment, the cutoff laser 126 is controlled in the X, Y, and Z axes using the DSP controller 71 and its neural network. A fixture, schematically indicated at 130, may be used to support the material 124 on one or both of its edges 30, 32 so that the part does not change its freeform curvature. To this end, and in the preferred embodiment, the cutoff laser 126 is supported upon a robotic arm, generally indicated at 132 which controls the cutting of the material in the X, Y, and Z axes. In this way, a discrete backbone 12 is formed.

The individual backbones 12 are now ready to be cleaned and painted. However, prior to any painting or coating operation, the backbones 12 may be subjected to additional heat treats including annealing, quenching, and/or cooling of the backbones. More specifically, and as indicated in FIG. 9, the backbones 12 may be subjected to an end treatment 134. This may include, for example, forming a downwardly extending, cup shaped lip portion at either end of the backbone as indicated at 136 and 138 in FIG. 9. These lip portions eliminate sharp edges and act to receive the terminal ends of the rubber wiper elements 14 in the event that they extend the entire longitudinal length of the backbone 12. In any event, the backbones 12 are next subjected to a conventional powder-coating operation 140 (FIG. 9) at a clean and paint station 52 (FIG. 8). However, those having ordinary skill in the art will appreciate that the backbone 12, or another part manufactured using the method and apparatus of the present invention, may be subject to other post forming operations without departing from the scope of the invention. Because the backbone 12 forms the part of a visible windshield wiper system, its finish requirements are that of a class A surface. Thus, the surfaces of the backbone 12 must be smooth from all previous operations and free of any sharp edges. Furthermore, the backbone must be free of any visible surface irregularities, which may sometimes appear as wavy marks. The edges of the backbone produced at the width profiling station 46 must be free of drowse and, to a somewhat lesser extent, the edge scallop marks which may be produced in the laser cutting process which produces the width profile to the backbone 12. The heat-treated surfaces of the backbone 12 must also be free of scale and should have minimal decarborization.

In the preferred embodiment, the backbone 12 will be clamped in the part cleaning and painting station 52 and subjected to an acid dip 143 which cleans the part as well as phosphate 144 and powder spray 146 (FIG. 9). The sprayed backbone 12 will then be baked in a conventional manner as indicated at 148 in FIGS. 8 and 9. A coupler, of the type indicated at 18 in FIG. 1, is then attached to the backbone 12 (see 150 FIG. 9). This may include the steps of locating the backbone 12 in a predetermined position 158 and attaching the coupler 18 thereto to form a beam blade windshield wiper assembly as indicated at 152 on the flow chart of FIG. 9. Thereafter, a wiping element of the type indicated at 14 in FIG. 1 will be mounted to the backbone 12 as indicated at 156 in FIG. 9. With reference primarily to FIG. 9, this may include the step of locating the backbone 12 in a predetermined position (160), applying an adhesive such as glue to one surface of the backbone 12 (162), positioning the rubber wiping element 14 relative to the backbone 12 and applying a sufficient pressure to adhesively attach the wiping element 14 to the downwardly curved, arcuate surface of the backbone 12 (164). The adhesive is then allowed to cure (166). The assembly may also be subjected to a corona treatment or other surface energy producing process, as indicated at 154 in FIG. 9. Such a treatment involves the application of a high voltage to the backbone 12 at a low current. This treatment assists the bonding of the rubber wiping element 14 to the backbone 12 via the adhesive. The assembly is thereafter available for packaging, storage, and/or shipping, as is generally indicated at 168 in FIG. 9.

The method and apparatus of the present invention is adapted to accommodate continuous flow of the working material 56, 70, 96 and 124 from the payoff coil station 42 through the cutting station 50 wherein the backbones 12 are ready for cleaning and painting at 52. A production line 40 employing the method and apparatus of the present invention will ideally run at 10 m/min. and, it is estimated that the coil will last for over 50 hours. Operator interface (schematically indicated by the acronym "HMI" for Human Machine Interface in FIG. 9) will be minimal and will consist, primarily, of monitoring the status of the production line 40 and the product quality being produced, rather than control of the process. The production line 40 may include a limited number of hard tools, but, ideally, is software controlled to allow changes and modification to the end products "on the fly." Ideally, the production line 40 described above is "virtually tooled" which can produce any number of different parts without stopping or even slowing the manufacturing process. The production line 40 relies on a digital signal processing computer 71 employing a neural network having a design database including predetermined manufacturing settings which control the overall process to produce the end product. Thus, the method and apparatus of the present invention offer numerous advantages over the traditionally hard-tooled production lines known in the related art. Most notably, these advantages include the ability to continuously flow process the material while reducing or eliminating, as much as possible, batching processes in the production of a part, component or subcomponent. This results in a reduction of costs, waste and labor expenses. The method and apparatus of the present invention also provides improvements in inventory turns and more efficient utilization of raw materials. Furthermore, the cost to manufacture and build a production line 40 employing the method and apparatus of the present invention is less than the cost to tool a family of parts employed to manufacture products, such as windshield wiper assemblies, known in the related art.

As noted above, the method and apparatus of the present invention may be employed to manufacture any number of discrete, curved components or parts. And, while the method and apparatus of the present invention has been described in the context of manufacturing a curved, backbone of a beam blade-type windshield wiper assembly, those having ordinary skill in the art will appreciate that the method and apparatus of the present invention may be employed to manufacture any number of curved parts, components and/or subcomponents and that the present invention is not limited to automotive applications, in general, nor windshield wiper assemblies, in particular. Furthermore, it will be appreciated that the present invention is in no way limited to the specific type of feed stock employed in connection with the manufacture of a beam blade windshield wiper assembly. Accordingly, the term "feed stock" as used herein should be given its broadest possible interpretation so as to include, for example, but necessarily be limited to: coil stock, plate stock, sheet stock, strip stock, tube stock including seamless and seam-welded, round, square, rectangular or any other geometric shape of tube stock, bar stock, cast parts, forged parts, extrusion stock, stamped stock, and wire stock. In addition, those having ordinary skill in the art will readily appreciate that the present invention may also be employed in spin-forming operations, roll-forming operations. Similarly, the present invention may also be employed to repair damaged metal parts and structures, for example, highway and railroad bridge girders, jet engine components damaged from ingested foreign objects, earthquake damaged building structures, etc. The present invention may be employed to remove distortion caused by thermal processing such as welding, brazing, soldering, heat treatments and the like. Those having ordinary skill in the art will also appreciate that the method and apparatus of the present invention may be employed in the forming or repair of dies for stamping and casting operations, the forming or repair of molds and pre-forms for fabrication of composite structures such as aircraft and spacecraft body and structural members, body and structural members of boats, ships and the like. In addition, the method and apparatus of the present invention may be employed to pre-form components in preparation of other forming operations, for example, pre-bending of tubes prior to hydro-forming operations. The present invention may also be employed to impart surface modifications such as grain size reduction, and may also include additional process steps such as addition heat treatment or hardening. Furthermore, the method and apparatus may be employed in manufacturing operations that require gas and/or powder environments to impart specific surface chemistry to the work piece.

The invention has been described in an illustrative manner. It is to be understood that the terminology that has been used is intended to be in the nature of words of description rather than of limitation. Many modifications and variations of the invention are possible in light of the above teachings. Therefore, those having ordinary skill in the art will appreciate that within the scope of the appended claims, the invention may be practiced other than as specifically described.

We claim:

1. An apparatus for manufacturing a discrete curved backbone for a beam blade windshield wiper assembly from feed stock, said apparatus comprising:
   a cold rolling mill that imparts a predetermined thickness to the work piece;
   a width profiling station that imparts a predetermined width to the work piece; and
   a curvature forming and heat treat station, said curvature forming and heat treat station including a first source of heat that is adapted to impose a focused beam of heat on at least one surface of the work piece, said beam of heat defining a major axis and a minor axis on the work piece, said major axis of said focused beam of heat being disposed substantially transverse to the relative movement of the work piece with respect to the beam of heat and imparting a predetermined radius of curvature about said major axis, a cooler adapted to cool the work piece after it has been heated by said first source of heat, and a second source of heat to temper the work piece after it has been cooled.

2. An apparatus as set forth in claim 1 wherein said cold rolling mill includes a pair of opposed rollers that are rotatable about axes disposed generally transverse to the direction of travel of the work piece through said cold rolling mill and between said pair of opposed rollers.

3. An apparatus as set forth in claim 2 wherein at least one of said pair of rollers is moveable in a direction perpendicular to the path of the work piece through said cold rolling mill and toward and away from the other of said pair of rollers.

4. An apparatus as set forth in claim 1 wherein said width profiling station includes a twin-headed laser that generates a pair of beams disposed spaced apart relative to each other and that impinge upon the work piece thereby cutting the work piece to a predetermined width.

5. An apparatus as set forth in claim 4 wherein said twin-headed laser includes a diode-pumped Nd: YAG laser having a 50/50 laser beam splitter.

6. An apparatus as set forth in claim 1 wherein said first source of heat imposes a beam of heat having substantially an oval shape such that the beam shape defines a major axis and a minor axis and wherein said beam of heat substantially traverses the surface of the work piece.

7. An apparatus as set forth in claim 1 wherein said first source of heat imposes a beam of heat defining substantially a line of heat extending substantially transverse to at least one surface of the work piece.

8. An apparatus as set forth in claim 1 wherein said first source of heat is a laser that produces a diffuse beam of light directed toward at least one surface of the work piece thereby heating the work piece and causing the surface to expand such that the work piece moves in the direction of said laser thereby imparting a predetermined radius of curvature to the work piece.

9. An apparatus as set forth in claim 1 wherein said first source of heat is a water cooled, plasma, infrared lamp that produces a beam of light directed toward at least one surface of the work piece thereby heating the work piece and causing the surface to expand such that the work piece moves in the general direction of said infrared lamp thereby imparting a predetermined radius of curvature to the work piece.

10. An apparatus as set forth in claim 1 further including a plurality of sensors that operatively sense predetermined parameters of the work piece as it passes through the apparatus and a neural network coupled to said plurality of sensors, said neural network adapted to receive data sensed by said plurality of sensors, to compare the sensed data with stored data and to generate signals to said cold rolling mill, width profiling station, curvature forming and heat treat station thereby operatively controlling same.

11. An apparatus as set forth in claim 1 wherein said apparatus further includes a cutting station for cutting the work piece to a predetermined length.

12. An apparatus as set forth in claim 11 wherein said cutting station includes a cut off laser that is adapted to cut the work piece to a predetermined length.

13. An apparatus as set forth in claim 12 wherein said cutting station includes a robotic arm, said cut-off laser operatively supported upon said robotic arm and controlled in the x, y, and z axes so as to cut the work piece to said predetermined length.

14. A method of manufacturing a discrete curved backbone for a beam blade windshield wiper assembly from feed stock, said method comprising the steps of:

imparting a predetermined thickness to a work piece;

imparting a predetermined width to the work piece;

providing a first source of heat that is adapted to impose a focused beam of heat on at least one surface of the work piece wherein the beam of heat defines a major axis and a minor axis on the work piece and the major axis of the focused beam of heat is disposed substantially transverse to the relative movement of the work piece with respect to the beam of heat, the beam of heat imparting a predetermined radius of curvature about said major axis;

cooling the work piece after it has been heated by the first source of heat; and tempering the work piece after it has been cooled.

\* \* \* \* \*